(No Model.)
J. E. GREEN.
FISH TRAP.
No. 400,206. Patented Mar. 26, 1889.
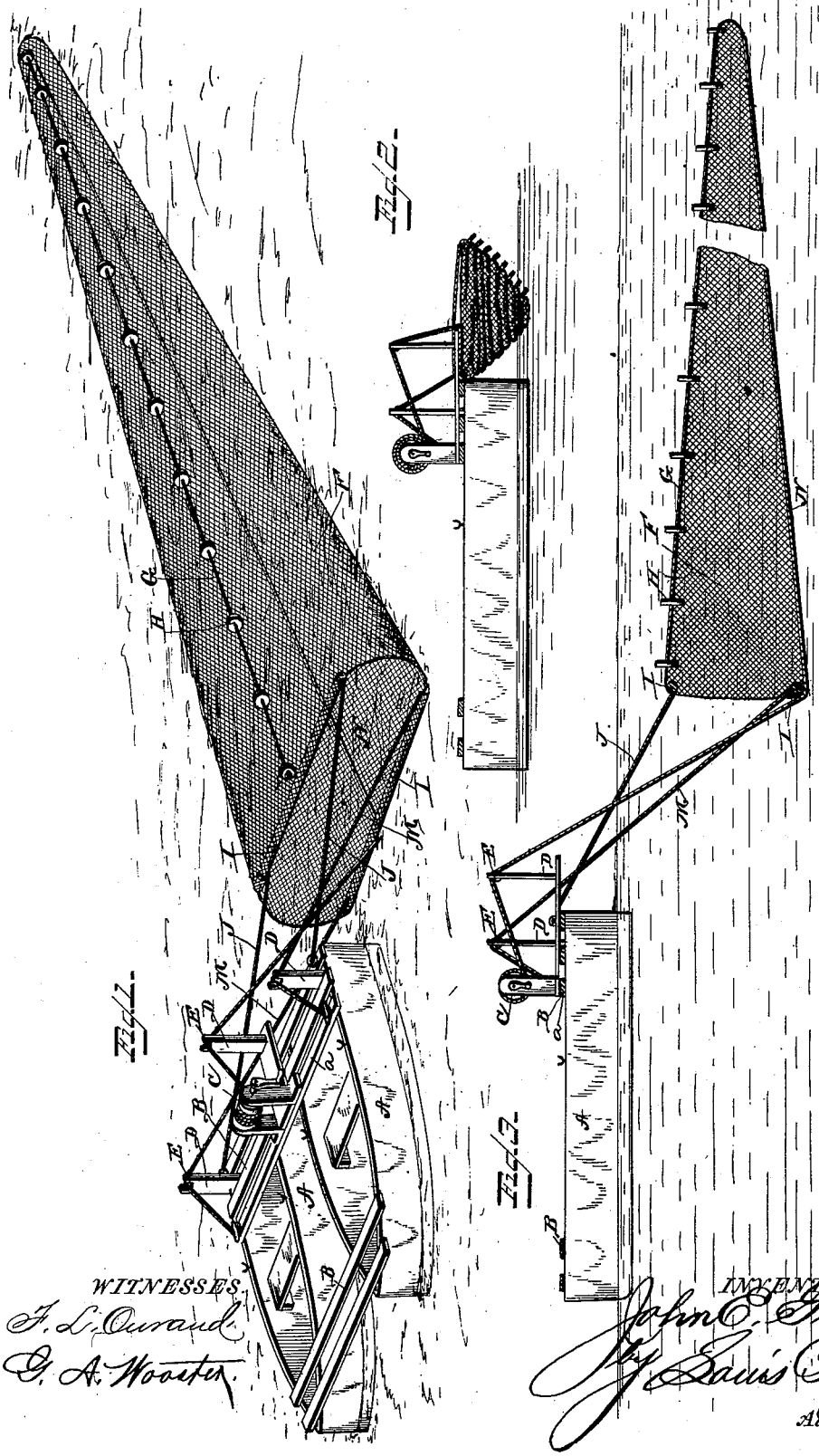

UNITED STATES PATENT OFFICE.

JOHN E. GREEN, OF BREMOND, TEXAS.

FISH-TRAP.

SPECIFICATION forming part of Letters Patent No. 400,206, dated March 26, 1889.

Application filed September 24, 1888. Serial No. 286,235. (No model.)

*To all whom it may concern:*

Be it known that I, JOHN E. GREEN, a citizen of the United States, and a resident of Bremond, in the county of Robertson and State of Texas, have invented certain new and useful Improvements in Fish-Traps; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the device, showing two boats secured together, a trap-net secured to the same, and the tackle for operating it; and Fig. 2 is a longitudinal vertical sectional view taken through the center of the device and showing the trap-net drawn up in a position for removing the fish. Fig. 3 is a longitudinal view of Fig. 1.

Similar letters of reference denote corresponding parts in all the figures.

My invention has relation to fish-traps; and it has for its object to provide a trap which may be drawn in the rear of two boats secured together, and which after having become loaded with fish will permit of it being drawn to the stern of the boats and the fish removed.

With these objects in view the invention consists in the improved construction and combination of parts of the same, as will be hereinafter fully described, and pointed out in the claims.

In the accompanying drawings, the letter A designates two boats joined together by the scantlings B. Mounted on a cross-piece, a, is a windlass, C, of the well-known construction.
To the rear of these boats are secured three standards, D, the two end ones being secured directly to the boats and the middle one to the scantlings. In the upper ends of these standards are journaled pulleys E, the object of which will be hereinafter fully set forth.

F designates the trap-net, tapering from its forward open end to its closed rear end, and provided upon its upper flap or side with a rope, G, which has fastened, at suitable intervals apart, to it corks H or other buoyant substances. Each flap of the mouth of the trap-net is provided with a rod, I, whereby the mouth is retained laterally extended, as well as opened, due to the corks arranged upon the upper flap of the trap. Secured to the upper one of these rods at the ends thereof are two ropes, J, which are attached at their opposite ends to the two end standards. These ropes are sufficiently long to allow the mouth of the trap-net to trail in the water behind the boats, and may be adjusted by winding them around the cleats, so as to increase or decrease the distance between the boats and the net when desired.

If desired, a rope, L, may be employed for assisting in retaining the mouth of the trap-net open. This rope is secured at one end to the intermediate portion of the rod secured to the upper flat of the mouth of the trap-net, and is secured with its other end to the middle standard.

Secured to the under or lower rod of the mouth of the trap-net are two ropes, M, which pass up over the pulleys in the two end standards and have for their object to draw the mouth of the net to the rear end of the boats. A draw-rope passes in and out through the entire length of the under flap of the trap-net, as shown at N, and is secured with its rear end to the rear end of the trap-net, and passes with its other end over the pulley journaled in the top of the middle standard.

The operation of my device is as follows: The boats are made to move either by sail or oars, and the net is allowed to trail at a suitable distance in the rear with its mouth open. After a sufficient quantity of fish have been caught the two ropes M are drawn in to bring the mouth of the trap against and over the stern of the boat; then the entire net is drawn in by winding the draw-rope upon the windlass. In drawing the mouth of the net to the stern of the boats it will be seen that the mouth will be closed, due to the upward pull of the ropes M, thus preventing any fish escaping.

It will be seen that by joining the two boats together the mouth of the net may be made wider than if but one boat were employed, and, further, that a steady motion is obtained and the two boats are not so liable to capsize in hauling in the net, as one boat.

From the foregoing description, taken in connection with the accompanying drawings, the operation and advantages of the invention will be readily understood without requiring an extended explanation. It will be seen that it is simple of construction, can be easily operated, and that it is well adapted for the purpose for which it is designed.

Having thus described my invention, I claim and desire to secure by Letters Patent of the United States—

1. The combination of two boats arranged side by side or parallel with each other and connected by scantlings B with a trap-net secured to the stems of said parallel boats, and draw-ropes and ropes for attaching the trap-net to the boats, substantially as specified.

2. The combination, with the boats secured together, of a trap-net flexibly connected to the sterns of said boats, a standard secured to the said boats and provided with a pulley in its upper end, and a draw-rope secured to the said net in the manner herein set forth, and having its free end passing over the said pulley, substantially as and for the purpose herein set forth.

3. The combination, with two boats secured together, of a trap-net flexibly connected to the sterns of the said boats, a standard secured upon the said boats and having a pulley mounted in its upper end, a windlass mounted upon the said boats, and a draw-rope secured to the trap-net in the manner herein described, passing with its free end over the said pulley in the standard and around the said windlass, substantially as and for the purpose herein described.

4. The combination, with the two boats secured together, of standards secured to the same and provided with pulleys in their tops, a trap-net connected to the standards by ropes, ropes secured to the mouth of the net and passing over the pulleys of the end standards, and a draw-rope secured to the said net, in the manner substantially as described, and passing over the pulley in the upper end of the middle standard, substantially as set forth.

5. The combination, with the two boats secured together, of the standards secured to the said boats and provided with pulleys in their upper ends, a trap-net flexibly connected to the sterns of the said boats, and having each flap of its mouth provided with a cross-rod, ropes attached to the ends of the lower rod and passing over the pulleys in the two end standards, and a draw-rope secured to the trap-net, in the manner herein set forth, and passing over the pulley in the upper end of the middle standard, all arranged to operate in substantially the manner herein set forth.

In testimony that I claim the foregoing as my own I have hereunto affixed my signature in presence of two witnesses.

JOHN E. GREEN.

Witnesses:
    T. J. BIRDWELL,
    T. G. CURRY.